Figure 1:
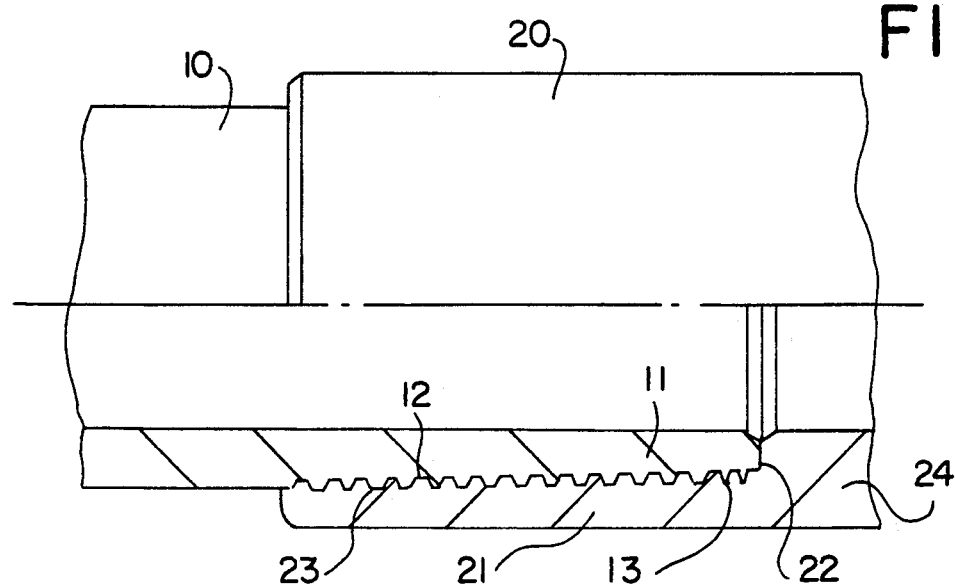

United States Patent [19]

Bovisio et al.

[11] Patent Number: 5,007,665
[45] Date of Patent: Apr. 16, 1991

[54] COUPLING FOR WELL CASINGS

[76] Inventors: Cipriano Bovisio, Via Borsa 12, 20100 Milano; Carlo Foglieni, Via San Bernardino, 95, 24100 Bergamo; Fulgenzio Fumagalli, Via Treviglio, 44, Fara D'Adda (Bergamo); Norberto Morlotti, Via Degli Albani, 17, 24100 Bergamo; Mario Palladini, Via Trieste, 32, 24044 Dalmine (Bergamo), all of Italy

[21] Appl. No.: 136,599

[22] Filed: Dec. 21, 1987
(Under 37 CFR 1.47)

[30] Foreign Application Priority Data

Dec. 23, 1986 [IT] Italy .................................. 48786 A86

[51] Int. Cl.$^5$ ............................................. F16L 15/00
[52] U.S. Cl. .................................. 285/334; 285/332.3; 285/333; 285/335; 285/390
[58] Field of Search ...................... 285/333, 334, 332.3, 285/355, 390

[56] References Cited

U.S. PATENT DOCUMENTS

| 138,277 | 4/1973 | Pelt | 285/390 X |
|---|---|---|---|
| 2,893,759 | 7/1959 | Blose | 285/390 X |
| 4,113,290 | 9/1978 | Miida | 285/355 X |
| 4,192,533 | 3/1980 | Blose | 285/355 X |
| 4,433,862 | 2/1984 | Raulins et al. | 285/390 X |
| 4,508,375 | 4/1985 | Patterson et al. | 285/390 X |
| 4,521,042 | 6/1985 | Blackburn et al. | 285/355 X |
| 4,550,937 | 11/1985 | Duret | 285/355 X |
| 4,629,224 | 12/1986 | Landriault | 285/390 X |
| 4,707,001 | 11/1987 | Johnson | 285/355 X |
| 4,732,416 | 3/1988 | Dearden et al. | 285/333 |
| 4,871,194 | 10/1989 | Kawashima et al. | 285/334 X |

Primary Examiner—Randolph A. Reese
Assistant Examiner—Carol I. Bordas
Attorney, Agent, or Firm—Young & Thompson

[57] ABSTRACT

A joint for casing tubes comprises a pair of tubes each having an external threading on at least one end, and hollow sleeve having corresponding internal threading on both ends. The internal threading of the sleeve on each end terminates in an annular seat which extends radially inwardly and axially toward its corresponding end of the sleeve, and thus has a frustoconical shape. The end surface of each of the threaded ends of the pair of tubes is correspondingly shaped. The threading on the sleeve and pair of tubes is so configured that when the sleeve and tubes are interassembled the crest of the internal threading of the sleeve will contact the root of the external threading on the tubes, whereas the crest of the external threading on the tubes will be spaced from the root of the internal threading on the sleeve.

3 Claims, 1 Drawing Sheet

COUPLING FOR WELL CASINGS

The present invention relates to an improved coupling for deep-well casings; more precisely it relates to a type of coupling suitable for both oil and geothermal wells.

To ensure the practicability of a deep well in time, the well is lined with a casing, consisting in lengths of special steel tubing screwed together and lowered into the borehole in stages during drilling.

The casing lengths are connected to each other either by forming threads on the inside of the one tube (female thread) and on the outside of the other tube (male thread) and then screwing the two tubes together (integral coupling) or by means of an internally threaded coupling member which fits over the externally threaded ends of the two tubes (sleeve coupling).

Drilling experts are only too aware of the problems to which couplings can give rise (whatever type is adopted) both during drilling and during subsequent operation of the well. It should be remembered that these problems are not limited to the difficulties associated with bucking-on and making-up the coupling correctly, but also relate to other important aspects such as the leak resistance of the joint, the effects of overtorque and the possibility of damage consequent to stress corrosion cracking. Such problems are further intensified by the fact that when said problems become apparent the casing has already been installed in the borehole and the defective coupling may be at several thousand meters of depth in the well.

It is not surprising, therefore, that considerable efforts have been made (and continue to be made) to solve these problems and to improve connection design. Even so, it is still difficult to find a threaded coupling which eliminates, if not all, at least the most important of these problems.

For example, leak resistance problems have been mastered by adopting elastic seal rings and bucking-on facilitated by increasing the taper, or flare, of the threaded ends. Make-up, too, has been improved by reducing the number of threads per inch in step with the increase in casing diameter, adopting the standard hardware practice in accordance with which nuts and bolts of large diameter have a coarser pitch/diameter ratio than those of small diameter.

However, all these efforts have not as yet been coordinated and, as a result, a threaded coupling is still not available which is easy to install, provides maximum seal also in the presence of high internal/external pressure differentials, reduces the risks of overtorque damage and has a state of stress after make-up that is not higher than that prevalent in the casing wall.

It is an object of the present invention, therefore, to provide a sleeve coupling for wells casings, even of large diameter, which is easy to buck-on and which can be made-up easily and correctly under rig running conditions of considerable severity.

Another object of this invention is to provide a coupling which gives excellent guarantees of seal and which has a leak resistance that intensifies as the difference between the internal and external pressure increases.

Still another object of this invention is to provide a coupling design that minimizes the risk of damage to pin and box members or to the seal in the event of faulty or unskillful make-up under rig running conditions.

A further object of this invention is to prevent mechanical damage to the coupling as a result of overtorque.

Another object of this invention is to prevent the state of stress in the coupling from rising, during service, above the level of the stress situation in the casing.

A further additional object of this invention is to reduce drastically the risk of damage to the coupling as a result of stress corrosion cracking.

These, and other, objects and advantages are obtained by means of a special connection design, the essential features of which are described briefly below.

According to the present invention, in a joint for casing tubes, in which each end of each of said tubes constitute the male-threaded tapered part of a joint, while the female part of said joint is a hollow sleeve internally threaded at both ends, and in which said hollow sleeve is further provided beyond the inner ends of its threaded portions with a protruding abutting seat for the terminal threaded parts of the tubes, an improvement is introduced characterized in that said protruding abutting seat, having an inner diameter similar to the inner diameter of said tubes, is provided with conically shaped surfaces, backwards slanted with respect to the internal cylindrical surface of the sleeve, said surfaces cooperating with similar surfaces at said terminal threaded parts of the tubes, to form a perfect seal when said surfaces mate, while the crest of the female thread on said hollow sleeve adheres perfectly to the root of the male thread on the tube, which crest is spaced from the root of the female thread on said hollow sleeve.

In addition, on both threads, the forward faces that draw the male into the female thread are slanted backwards and form an angle of 0–3 degrees with respect to a line perpendicular to the axis of the joint. The back faces, instead, are slanted forwards and form an angle of 23–28 degrees with respect to a line perpendicular to the axis of the joint, the back faces do not come into contact with each other and clearance of 0.04–0.08 mm is maintained between them, equal to the clearance between the crest of the male thread on the tube and the root of the female thread on the hollow cylinder, with regard to the conically shaped surfaces on the seat, and to the corresponding surfaces at terminal parts of the tubes, both surfaces form an angle of 2–5 degrees with respect to a line perpendicular to the axis of the joint.

Figure 2:
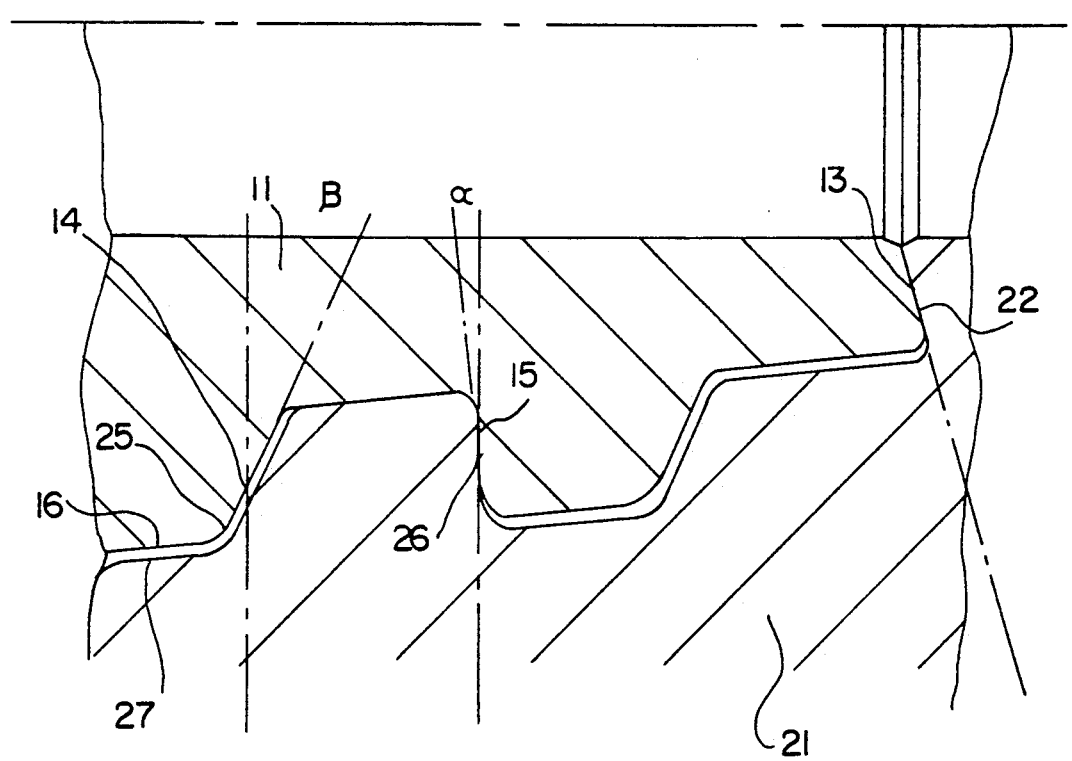

The present invention will now be described in fuller detail and with reference to the realization shown (purely as an example) in the plate attached to this Complete Specification, where:

FIG. 1 gives a side view, with partial crosssection, of the coupling under this invention;

FIG. 2 gives a scaled-up detail of the drawing in FIG. 1, showing the principal characteristics of the present invention.

The terminal part (11) of the tube (10) is threaded with a buttress thread profile (12). A similar buttress thread profile (23) is formed on the inner flared end (21) of the sleeve (20). For obvious reasons of symmetry, only the left-hand end of the sleeve is shown in the drawing.

The sleeve (20) presents, at the inner end of the buttress thread (23) a seat (22) protruding towards the axis of the joint; the terminal part (11) of the tube (10) terminates with a facing surface (13) that abuts on the seat. Both seat (22) and facing surface (13) are slanted backwards to form an angle $\gamma$ of 2–5 degrees with respect to a plane perpendicular to the axis of the joint.

As shown in FIG. 2, the thread helix on the terminal part (11) is slightly less high than the thread helix on the flared end (21) of the sleeve; consequently, the crest of the thread on the sleeve touches the root of the thread on the tube, while the crest of the thread on the tube does not touch the root of the thread on the sleeve.

In FIG. 2, for reasons of greater clarity, the principal characteristics of the invention have been scaled-up in slightly magnified proportions with respect to the rest of the drawing; in this way it can be seen that, during make-up of the joint, the forward faces (15) and (26) of the two thread helices are in direct contact while the back faces (14) and (25) do not touch.

The clearance between faces (14) and (25) is preferably equal to the clearance between the crest (16) of the thread on the tube and the rest (27) of the thread on the sleeve.

In addition, the flank angle $\alpha$ of faces (15) and (26) is set to a value between 0 and 3 degrees, while the flank angle $\beta$ of faces (14) and (25) is set to a value between 23 and 28 degrees.

The profile and dimensional features of the threads permit a far easier and more rapid make-up, while the clearance between the back faces of the helices ensures correct thread engagement upon completion of make-up. Moreover, the seat makes it possible to obtain the following additional advantages:

completion of make-up is sensed immediately, since the torque then rises steeply and abruptly;

coupling is made-up to desired tightness without the risk of overtorques which would strain the mating surfaces to an unacceptable degree and give rise to a dangerous uncontrolled increase of the tangential stresses in both sleeve and terminal part of tubes;

internal stress levels are distributed according to patterns that leave the intermediate and external superficial layers of the coupling elements substantially unaffected, thereby making the joint extremely suitable for use in those operating situations where environmental conditions involve stress corrosion cracking risks.

An interesting additional advantage of the coupling design under this invention is given by the conical shape of the seat (22) and facing surface (13) and by the lay of their interface with respect to the axis of the joint. When a coupling is made-up and the two surfaces come into contact, they form a very tight seal (in addition to signalling make-up completion), since they adhere perfectly to each other and their mutual adhesion is unaffected by eventual variations of internal or external pressure.

The test characteristics of the joint under this invention have been listed in the table on page 8 (purely as an illustrative example and in no way limitative of the scope and purposes of the present invention) and refer to joints made of API-NBO grade steel. The table gives the loadings adopted and the results obtained for each of the different tests carried out on the prototype couplings.

The following final make-up torque (T) were adopted for the tests:

Tmin = 8130 N·m,
Toptimal = 10170 N·m
Tmax = 12,200 N·m,
Tovertorque = 1.25 · Tmax The meansing of the symbols in the table is as follows:
YSmin = minimum yield strength of N SO steel;
USTmin = minimum admissible ultimate strength;
Pimin = minimum internal pressure at which tube reaches yield point;
Mf = bending moment required for producing a pre-established deflection of the tube, measured in degrees for a length of 100 feet.

It is worth noting that, although the values listed are in each case the most unfavorable result obtained in a series of ten tests, the stress level in the joint remains invariably below the safety threshold and is almost always lower than the stress level in the tube, especially for loadings equal to 80% of the minimum yield strength which correspond to the normal working loads for these materials.

| | | | STRESS LEVELS (MPa) | |
| --- | --- | --- | --- | --- |
| | | In | In coupling | |
| TYPE OF TEST | TEST LOADINGS | Tube | Sleeve | Tube end |
| Make-up | Tovertorque | 0 | 50–200 | 150–300 |
| Make-up + | Tmin; 80% YSmin | 400 | 100–200 | 250–350 |
| Axial Tension Load | Tmin; 100% YSmin | 550 | 180–320 | 300–400 |
| | Tmin; 100% USTmin | 700 | 300–420 | 350–580 |
| Make-up + | Tmax; 80% YSmin | 420 | 80–180 | 300–420 |
| Axial Compression Load | Tmax; 100% YSmin | 550 | 150–250 | 340–520 |
| Make-up + | Tovertorque; 60% Pi min | 350 | 120–260 | 120–190 |
| Internal Pressure | Tovertorque; 80% Pi min | 450 | 130–250 | 120–190 |
| Make-up + | Toptimal; Mf = 6°/100° | 180 | 10–180 | 30–190 |
| Bending Moment | Toptimal; Mf = 8°/100° | 220 | 190–320 | 200–330 |
| Make-up + Internal Pressure + | Tovertorque; 50% YSmin; 80% Pi min | 350 | 190–310 | 100–390 |
| Axial Tension Load | Tovertorque; 50% YSmin; 90% Pi min | 420 | 220–390 | 100–410 |
| Make-up + Internal Pressure + | Toptimal; Mf = 8°/100°; 85% Pi min | 380 | 170–370 | 110–390 |
| Bending Moment | Toptimal; Mf = 8°/100°; 95% Pi min | 410 | 200–400 | 100–400 |
| Leak Resistance | Toptimal; 85% Pi min: | | | |
| | without pinhole | no leak after 40-hour duration: test interrupted | | |
| | with 3-mm # pinhole on sleeve at seat level | no leak after 60-hour duration: test interrupted | | |

We claim:

1. A casing joint comprising a pair of tubes and a hollow sleeve, each of said pair of tubes having at least one externally threaded end and said hollow sleeve having internally threaded opposite ends adapted to receive the externally threaded ends of the pair of tubes, wherein the internal threading on each of the opposite ends of the hollow sleeve terminates in an abutment extending radially inwardly and axially toward its respective end of the hollow sleeve to define a frustoconical surface, each externally threaded end of the pair of tubes having a complementarily shaped end surface for engagement with said abutment surfaces of the hollow sleeve, the external threading on the pair of tubes and the internal threading of the hollow sleeve being so dimensioned that, when the pair of tubes are received in the opposite ends of the hollow sleeve, the crest of the internal threading on the opposite ends of the hollow sleeve contacts the root of the external threading on the pair of tubes received in the hollow sleeve and the crest of the external threading of the tubes received in the sleeve is spaced from the root of the internal threading on the opposite ends of the hollow sleeve; and wherein forward faces of the internal threading on the opposite ends of the hollow sleeve are inclined outwardly toward their respective end of the hollow sleeve by an angle up to about 3 degrees with respect to a plane extending transversely through said hollow sleeve, forward faces of the external threading on the ends of the pair of tubes are inclined outwardly towards their respective end of the tube by an angle of up to about 3 degrees with respect to a plane extending transversely through the tube, back faces of the internal threading on the opposite ends of the hollow sleeve are inclined outwardly away from their respective end of the hollow sleeve by an angle from about 23 to about 28 degrees relative to a plane extending transversely through said hollow sleeve, and back faces of the external threading on the ends of the pair of tubes extends outwardly away from the corresponding ends of the tubes at an angle of about 23 to about 28 degrees with respect to a plane extending transversely through the said tubes.

2. The casing joint according to claim 1, wherein the abutment seats of the hollow sleeve and the correspondingly shaped end surfaces of the pair of tubes form an angle from about 2 to about 5 degrees with respect to a plane extending transversely through the sleeve or tubes.

3. The casing joint according to claim 1, wherein said internal threading on the opposite ends of the hollow sleeve and said external threading on the ends of the pair of tubes are so dimensioned that a clearance from about 0.04 to about 0.08 mm is maintained between the crest of the external threading and the root of the internal threading, when the pair of tubes are received in the opposite ends of the hollow sleeve.

* * * * *